F. WINKLER.
MULTIPLE SPEED GEARING.
APPLICATION FILED MAY 28, 1912.

1,045,238.

Patented Nov. 26, 1912.

2 SHEETS—SHEET 1.

Witnesses

Inventor

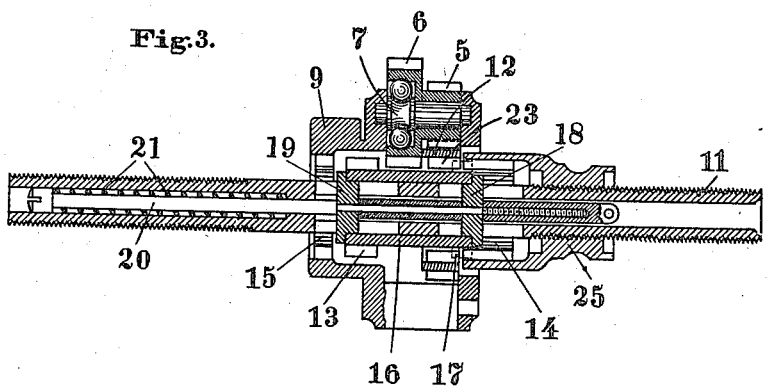
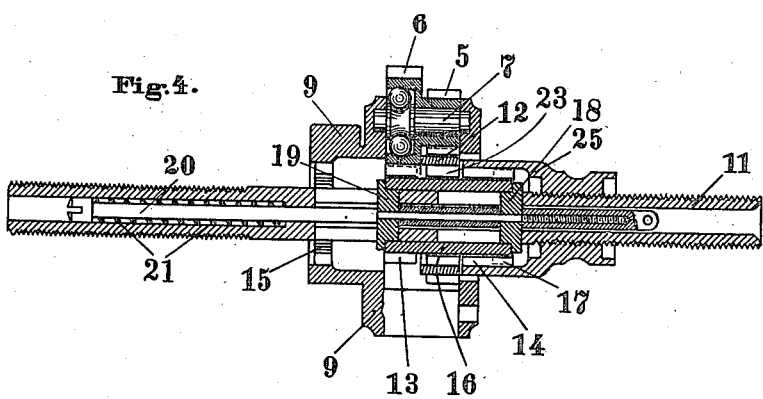

UNITED STATES PATENT OFFICE.

FRANZ WINKLER, OF SCHWEINFURT, GERMANY, ASSIGNOR TO SCHWEINFURTER PRÄCISIONS-KUGEL-LAGER-WERKE FICHTEL & SACHS, OF SCHWEINFURT, GERMANY.

MULTIPLE-SPEED GEARING.

1,045,238.

Specification of Letters Patent. Patented Nov. 26, 1912.

Application filed May 28, 1912. Serial No. 700,226.

*To all whom it may concern:*

Be it known that I, FRANZ WINKLER, a subject of the King of Bavaria, residing at No. 23 Rossbrunnstrasse, Schweinfurt, in Germany, have invented a new and useful Multiple-Speed Gearing, of which the following is a specification.

The invention relates to a planet-wheel gearing enabling three speeds to be produced by the adjustment of certain elements of the combined gearing. In this device two sets of planet-gearings are provided and positively connected with one another by their planet-wheels rigidly united, each set of planet-wheels meshing with a separate sun-wheel loosely rotatable on the axle of the gear. An internally toothed rim is provided on the driving body and meshes with one set of planet-wheels, while the pivot pins of the planet-wheels are attached to the driven member or vice versa.

The main object of the invention is to so construct the sun-wheels and their couplings that they can be connected to rotating or stationary parts of the gearing.

A further object of the invention is to reduce the number of operative elements required in combination with the gearing for obtaining the said effect.

These objects are attained by so arranging the sun-wheels that one of them which is displaceable also forms the coupling member of the other sun-wheel and is capable of coupling the same with the planet-wheel carrier for setting the entire gearing idle, or with a stationary part, thus rendering the corresponding planet-wheel-set operative, while in its middle position the said displaceable combined sun-wheel and coupling member is fixed stationary and produces working of its own planet-wheel set. To this end the movable sun-wheel is located in the bore of the non-displaceable sun-wheel having clutch teeth adapted to engage an additional toothed rim of the movable sun-wheel situated upon its opposite end and being the clutch member permitting the various connections.

In the accompanying drawings which form a part of this specification, a multiple speed gearing embodying the invention is represented, a construction of double planet-gearing being shown for purpose of example, in order to illustrate the main features of the gearing.

Figure 1:
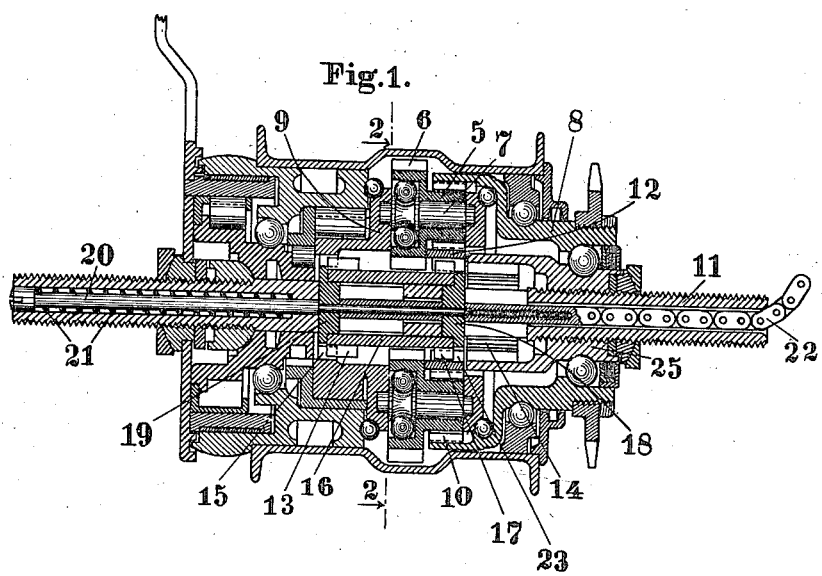
Figure 2:
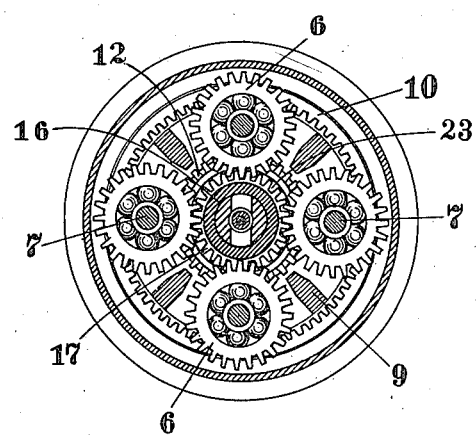

Figure 1 represents a longitudinal sectional elevation of the gearing employed with a coaster hub of cycles. Fig. 2 shows a cross-section taken on the line 2—2 of Fig. 1. Figs. 3 and 4 illustrate some main parts of the gearing adjusted in different positions as required for obtaining different speeds, the gearing being shown in longitudinal section similarly to Fig. 1.

Like numerals denote like parts throughout all figures of the drawings.

The planet-gearing comprises a number of stepped pinions 5 and 6 journaled on the pivot pins 7. The smaller wheels 5 mesh with an internally toothed rim 10 which forms part of the driving member 8, while the pivots 7 are fast on the driven member 9 and united at their free ends by a convenient end plate. Further, the planet-wheels 5 permanently mesh with a sun-wheel 12 which is rotatable but prevented from axial displacement. In the bore of this sun-wheel a sleeve 16 is rotatable and axially displaceable on the axle 11. Upon this sleeve are formed at one end a row of teeth 13 being the sun-wheel of the planet wheels 6, and at the other end a similar row of teeth 17. A bearing cone 25, rigidly fastened to the axle, is provided with a corresponding inside row of teeth 14, and the driven member 9 with an inside row of teeth 15. The arrangement is such that the rows of teeth 17 and 13 can be thrown into gear with the two inside rows of teeth 14 and 15, respectively. A similar row of inside teeth 23 is formed within the bore of the sun-wheel 12, into which teeth the row of teeth 17 of the sleeve 16 can be engaged.

The change of gear to obtain various speeds is effected by sliding the combined sun-wheel and clutch sleeve 16 along the axle 11, for which purpose any desired controlling device may be employed. In the example the sleeve 16 is guided between two keys 18 and 19 passing through suitably formed slots in the axle 11 to permit of their axial shifting, these keys being fastened between shoulders on a rod 20 movable inside the hollow axle. The rod 20 attached at one end to a convenient traction member, such as a chain 22, is continually under the action of a spring 21 tending to force it toward the left.

The device operates as follows: When the rod 20 is in its extreme left-hand position (Fig. 1), the clutch sleeve 16 is clutched to the driven member 9 owing to the engagement of the outer and inner rows of teeth 13 and 15 of the said parts, and is also clutched to the sun-wheel 12 owing to the engagement of the teeth 17 with the teeth 23, and consequently no relative rotation can take place between these parts. Owing to these gears being locked, the planet-wheels 5 and 6 cannot turn about their pivots 7, so that the driven member 9 is rotated by the driving member 8 at the same velocity by means of the internal gear 10 through the planet-wheels 5 and the pivots 7. When the chain 22 is pulled, whereby the sleeve 16 slides far enough to the right for the row of teeth 17 to mesh partly with the stationary internal teeth 14 and partly with the internal teeth 23 of the sun-wheel 12 (Fig. 3), the latter is held fast, whereas the driven member 9 is released from the toothed rim 13 of the sleeve 16. As soon as the driving member 8 is rotated, the planet wheels 5 now roll on the gear 10 and simultaneously on the sun-wheel 12, and thus rotate on their pivots 7, the result being that the velocity of the driving member 8 imparted to the driven member 9 forming the planet-wheel carrier is speeded down. This gives the greatest speed reduction. When the sleeve 16 is moved by pulling the chain 22, into its extreme right-hand position, the teeth 17 are drawn back from the teeth 23 but remain in gear with the teeth 14, while the row of teeth 13 now engages with the planet-wheels 6 (Fig. 4), the sun-wheel 12 being simultaneously liberated. When the parts are in this position and the gearing is driven, the planet-wheels 5 roll on the internal toothed rim 10, and the planet-wheels 6 on the teeth 13 of the stationary sleeve which constitutes their sun-wheel, the result being that now the driving member 8 and the driven member 9 again run at different speeds, and an intermediate reduction of speed occurs.

Apart from the simplification of the gearing owing to the reduction in the number of working parts and the consequent saving in space, this particular arrangement in which the clutch sleeve simultaneously forms the sun-wheel of one of the sets of planet-wheels has the important advantage that the planet-wheels 6 are entirely out of gear when not in operation, losses due to friction being thus diminished. In addition, the gear ratio can be suitably selected, because the planet-wheels 6 can be made with a comparatively large diameter, since their sun-wheel is mounted directly on the axle, i. e. it is constituted by the clutch sleeve of small diameter and slidable within the other sun-wheel 12.

The gearing can be arranged in various ways without alteration to the essential parts and particular mode of operation. For example, the part 9 may be the driving, and the part 8 the driven member; further, the internal gear 10 can mesh with the planet-wheels 6, in which cases a different gear ratio is obtained in the various positions. In the drawing the planet-wheel gearing is shown as applied to a bicycle hub. It will be understood however that it can also be used for other purposes, e. g. as the differential gear in motor-cars, as the intermediate gear in machine-tools and under certain circumstances as a substitute for the change-wheel gears in screw-cutting lathes and the like.

What I, therefore, broadly claim as my invention, and desire to secure by Letters Patent, is:

1. A planet wheel gearing for various speeds with two sets of planet wheel gearing united by their planet-wheels and having separate rotatably arranged sun-wheels, one of the sun-wheels being axially displaceable and so arranged with respect to the other sun-wheel that it constitutes the coupling means for the same in several of its positions and is adapted to couple the said sun-wheel to rotating and stationary parts of the gearing, respectively.

2. In a planet-wheel gearing having two sets of planet gearing connected by their respective planet-wheels, and having separate sun-wheels, one of them being non-displaceable, the other being located in the former and axially displaceable therein, and clutch means provided upon the said displaceable sun-wheel which is adapted to be coupled itself and to couple the non-displaceable sun-wheel to stationary or rotatable parts of the gearing, respectively, in its different positions.

3. In a planet-wheel gearing, the combination with two sets of planet-wheels connected with one another, of a non-displaceable sun-wheel for one set of planet-wheels, and an axially displaceable coupling sleeve having two rows of outer teeth, one of them constituting the sun-wheel of the other set of planet-wheels or clutch teeth, respectively, in different positions of the sleeve, the other row of teeth being adapted to couple the non-displaceable sun-wheel to rotating and stationary parts of the gearing in different positions of the said sleeve.

4. In a planet-wheel gearing, the combination with two sets of planet-wheels positively connected with one another, of driving and driven members in positive connection with the said planet-wheels, a non-displaceable sun-wheel for one set of planet-wheels, said sun-wheel having inner clutch teeth, and an axially movable sleeve with a plurality of toothed rims formed thereupon, one of which constitutes the sun-wheel of the other set of planet-wheels, while they are together adapted to couple the said non-displaceable sun-wheel to rotating or stationary parts of the gearing, respectively, in the different positions of the sleeve.

5. In a planet-wheel gearing, the combination with two sets of planet-wheels connected with one another, of an internally toothed rim and a non-displaceable sun-wheel meshing with one set of planet-wheels, driving and driven members in positive connection with said sets of planet-wheels, inner clutch teeth in the bore of said sun-wheel, a coupling sleeve axially movable in the bore of the said sun-wheel, a plurality of toothed rims upon the said coupling sleeve, one of which constitutes the sun-wheel of the other planet-wheel gearing, while they are together adapted to couple the said non-displaceable sun-wheel to a rotating member or with stationary parts of the gearing, respectively, in the different positions of the sleeve, and means for shifting the said sleeve.

In testimony whereof I have signed my name to this specification in the presence of two subscribing witnesses.

FRANZ WINKLER.

Witnesses:
 JEAN GRUND,
 CARL GRUND.